Figure 1:
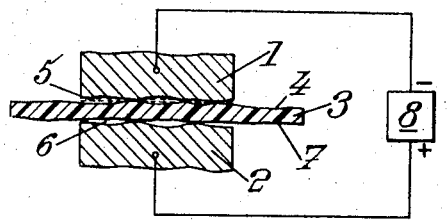
Figure 2:
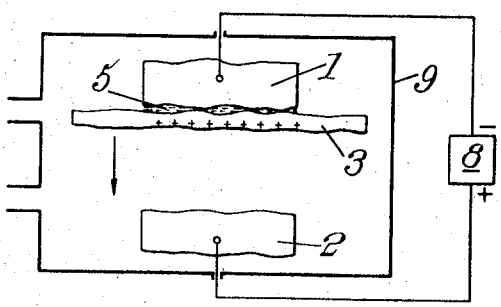
Figure 3:
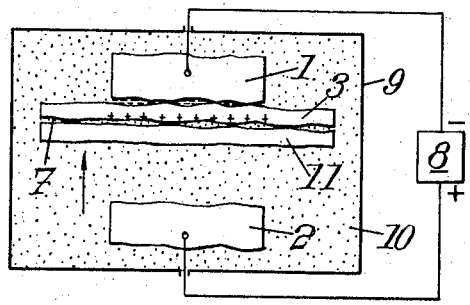
Figure 4:
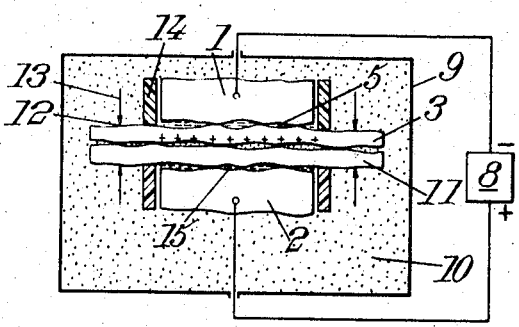

United States Patent [19]
Lewiner et al.

[11] 3,851,183
[45] Nov. 26, 1974

[54] ELECTRETS, TO METHODS AND DEVICES FOR MANUFACTURING THEM AND TO ASSEMBLIES COMPRISING ELECTRETS

[75] Inventors: Jacques Lewiner, Saint-Cloud; Danielle Legros, Paris, both of France

[73] Assignee: Agence Nationale de Valorisation de la Recherche (Anvar), Paris, France

[22] Filed: June 29, 1972

[21] Appl. No.: 267,544

[30] Foreign Application Priority Data
July 2, 1971  France............................ 24291/71

[52] U.S. Cl. .......................... 307/88 ET, 179/111 E
[51] Int. Cl............................................. H04r 19/00
[58] Field of Search............ 179/111 E; 307/88 ET; 29/592, 594; 117/227

[56] References Cited
UNITED STATES PATENTS

| | | | |
|---|---|---|---|
| 3,354,373 | 11/1967 | Fatovic ........................ | 307/88 ET |
| 3,588,382 | 6/1971 | Reedyk .......................... | 179/111 E |
| 3,705,312 | 12/1972 | Sessler et al. .................. | 307/88 ET |
| 3,748,727 | 7/1973 | Swain............................. | 307/88 ET |

*Primary Examiner*—Stanley M. Urynowicz
*Attorney, Agent, or Firm*—Larson, Taylor & Hinds

[57] ABSTRACT

The invention relates to electrets, i.e. dielectric foil on the surfaces of which charges are stored. In an electret according to the invention, the charged surface of the foil is in permanent contact with a fluid having a high dielectric strength (e.g. $CCl_4$, a rarified gas or liquid nitrogen) maintained against the surface by a peripherally welded second dielectric foil. Applications: biasing of a wide variety of electric circuits, more particularly ultrasonic transducers.

8 Claims, 6 Drawing Figures

ELECTRETS, TO METHODS AND DEVICES FOR MANUFACTURING THEM AND TO ASSEMBLIES COMPRISING ELECTRETS

The invention relates to electrets, i.e. to electrically charged dielectric foils. It also relates to methods and devices for manufacturing electrets and to assemblies, more particularly ultrasonic transducers, comprising electrets. The main aim of the invention is to enable electrets to store higher electric charge densities, and to store them more efficiently, than hitherto, thus improving the efficiency of assemblies equipped with electrets.

As is known, in prior-art electrets the density of the stored charges is often limited by the ionisation of the gas surrounding the dielectric. Although high-density charges can be stored on the surface of a dielectric (inter alia by electronic bombardment or by using a highly ionised gas), the density rapidly decreases since part of the charges migrates into the ionisable gas (e.g. the ambient air) which is subsequently in permanent contact with the aforementioned surface.

The invention obviates this disadvantage in that a fluid medium of high dielectric strength is placed in intimate contact with the surface just before it is charged, and thus prevents leaks.

In advantageous embodiments, the medium is a rarefied gas (inter alia air at a pressure below 1 millibar) or a gas having dielectric strength such as carbon tetrachloride, sulphur hexafluoride or some freons, or a cryogenic liquid such as liquid nitrogen.

Preferably, the medium is kept in contact with the charged surface of the dielectric foil by enclosing it between the surface and the facing surface of a second dielectric foil peripherally welded on to the periphery of the charged surface, each dielectric foil being between 5 and 100 microns thick and each being made of a substance of high dielectric strength adapted to preserve electric charges stored therein.

The method of enclosing the medium is preferably as follows: the first dielectric foil, the surface of which is to be charged, is inserted between two electrodes while leaving a very thin layer of ionisable gas, such as the layer of air normally occurring between the surfaces owing to the natural irregularity thereof, between at least one surface of the foil and the facing surface of the electrode; a d.c. voltage V below the breakdown potential of the dielectric foil but sufficient to ionise the layer of gas is applied between the two electrodes; the electrode in contact with the layer of gas is removed from the dielectric foil while maintaining the voltage V between the electrodes; the volume of ionisable gas between the separated elements is replaced by a fluid medium of high dielectric strength; the second dielectric foil is applied, with interposition of the fluid medium, to that surface of the dielectric foil which faces the electrode which has been moved away; the edges of the dielectric foils are sealed; and the voltage V is cut off.

The doublet formed by the two dielectric foils thus sealed to one another can then be separated from the other electrode and subsequently be used between two other conducting components.

If it is desired to charge only one surface of the dielectric, care is taken, when the first dielectric foil is initially assembled between the electrodes, to expel any ionisable gas from the place between one surface of the foil and one of the electrodes, inter alia by inserting a layer of dielectric oil or by metal-coating the surface.

In addition to the aforementioned main features, the invention comprises other features which are preferably used at the same time and which will be described in greater detail hereinafter.

Figure 5:
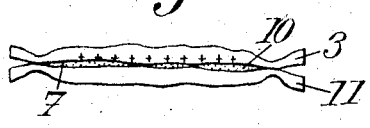
Figure 6:
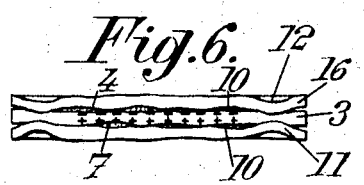

The following is a description of two preferred embodiments of the invention with reference to the accompanying non-limitative drawings in which:

FIGS. 1–4 diagrammatically shown the different steps in the manufacture of a highly-charged electret according to the invention, and FIGS. 5 and 6 are diagrams of two types of charged electrets according to the invention.

For the sake of clarity, only FIG. 1 has cross-sectional shading, although all the drawings are diagrammatic cross-sections.

We shall first with references to FIGS. 1–5, describe the manufacture of an electret comprising a dielectric foil charged on one surface only; this is adequate for a number of applications, more particularly in the assembly of ultrasonic transducers.

A thin dielectric foil 3 preferably between 5 and 100 microns thick is inserted between two conducting electrodes 1, 2. The foil is impermeable to gases and is made of a substance having high dielectric strength, e.g. corresponding to a spark-over field of the order of $2.10^6$ V/cm. Furthermore, the electron band structure of the substance has "deep traps" for electric charges stored on the surface thereof — i.e. the charges are separated from the external medium by relatively high potential barriers.

In preferred embodiments, foil 3, which is about 10 microns thick, is made of polypropylene or polyimide sold by the Societe Du Pont de Nemours under the trade name KAPTON.

Care is taken to expel any ionisable gas from the space between one surface 4 of foil 3 and the facing electrode 1, inter alia by inserting a layer of dielectric oil 5 (e.g. the oil sold by the Societe Rhone-Poulenc under the trade name RHODORSYL) or by metal-coating surface 4, in which case the resulting metal coating may be considered part of electrode 1.

On the other hand, the thin layer of air 6 is left between the other surface 7 of foil 3 and the other electrode 2. Preferably layer 6 is the layer which is naturally left between the facing surfaces of foil 3 and electrode 2 owing to natural irregularities in the two surfaces, the height of which is approx. 3–4 microns.

Next, a d.c. voltage V below the breakdown potential of dielectric 3 but sufficient to strongly ionise the layer of air 6 is applied between electrodes 1, 2 from an external source 8. If dielectric 3 is a sheet of polypropylene 10 microns thick and if the layer of air 6 is about 3–4 microns thick, voltage V is advantageously of the order of 1500 V or, more generally is between 1200 and 2000 V.

At this stage, surface 7 of foil 3 on the same side as the ionised air layer 6 is highly charged, as shown by the + signs on the drawings.

After voltage V has been applied for a few minutes, electrode 2 is moved away from dielectric 3 while continuing to apply voltage V and maintaining plane capacitor conditions between the electrodes.

The assembly is then placed in a sealing-tight chamber 9, the contents of which is replaced by a fluid medium 10 of high dielectric strength, shown diagrammatically by dots in the drawings. Advantageously the medium is one of the following gases: carbon tetrachloride $CCl_4$, sulphur hexafluoride $SF_6$, or one of the following compounds, which are frequently called freons: $CF_2Cl_2$, $CF_3Cl$, $CF_4$, $CHClF_2$, $CHF_3$. Alternatively, the medium can be air under reduced pressure; the pressure is less than one millibar and is preferably one tenth of a millibar. Alternatively, medium 10 can be a cryogenic liquid such as liquid nitrogen.

Next, a second dielectric foil 11 is applied to the charged surface 7 of dielectric foil 3. Foil 11 is thin, non-porous, and has at least as much resistance to electric charges as foil 3.

Dielectric foils 3, 11 are peripherally sealed to one another, while continuing to apply voltage V between electrodes 1 and 2, thus enclosing the charges stored on surface 7 of foil 3. Preferably the foils are sealed by a weld along a circumference 12 having a diameter greater than the charging electrodes 1, 2. To this end, use can be made of two annular electrodes diagrammatically shown by arrows 13 (FIG. 4) and separated from electrodes 1, 2 by electrically insulating rings 14.

The resulting doublet encloses the electric charges stored therein and, since the main cause of the decrease in charge density (i.e. contact with an ionisable gas) is eliminated, the density remains high for a considerable time.

Of course, the resulting doublet can subsequently be completely separated from the charging electrodes 1, 2 (FIG. 5) and can be stored until used between 2 other conducting components. When the doublet is stored, care should be taken to avoid contact between one of its external surfaces and any dielectric or metal medium, since this would produce an electric field capable of ionising the ambient air outside the doublet and near the surface. The ionised air on the surface would produce charges opposing the charges enclosed in the doublet.

Alternatively, a circuit comprising the doublet can be assembled without intermediate storage, e.g. by moving electrode 2 on to the outer surface of foil 11, inter alia with interposition of a layer 15 of electric oil (FIG. 14), and by subsequently replacing source 8 by any desired circuit.

If it is desired to charge both surfaces of the dielectric foil comprising the electret proper, as may be necessary in some applications such as push-pull electric circuits, the method is exactly as described apart from the following differences:

Instead of expelling the ionisable gas from one of the spaces between foil 3 and electrodes 1 and 2, the gas is retained in both spaces.

After voltage V has been applied and the electrode has been moved apart and the ionisable gas has been replaced by a medium having high dielectric strength, a second dielectric foil is inserted as before between surface 7 of foil 3 and electrodes 2, and a third dielectric foil 16 (FIG. 6) is additionally inserted between surface 4 of foil 3 and electrode 1.

Finally, the three dielectric foils 3, 11, 16 are sealed by a peripheral weld.

The resulting triplet or sandwich is diagrammatically shown in FIG. 6. The central foil 3 has electric charges of opposite sign on its two surfaces, both of which are in contact with medium 10.

The aforementioned electrets, both doublets and triplets, have electric charge densities considerably higher (at present approx. 5 to 15 times higher) than those known hitherto, and the densities can be maintained for a long time. The electrodes can be used by themselves for strong, lasting electric biasing in a variety of circuits, inter alia automatic circuits such as microphones, telephone receives or transmitters, pickups, or ultrasonic transducers. In the embodiment which has been described (a polypropylene sheet 3,10 microns thick, charged to a voltage of 2000 V), a permanent bias voltage of the order of 1000 V can be produced.

The electrets may with particular advantage be applied to ultrasonic transducers as disclosed in French Patent Application No. 70 41766 filed by the same applicants on 20 November 1970. In the aforementioned Application it is proposed to subject an ultrasonic transducer to mixed biasing provided partly by an electret forming part of the transducer and partly by an external voltage source connected in the opposite direction from the source used for charging the electret.

As the preceding clearly shows, the invention is in no way limited to those applications and embodiments described in detail, but includes all variants.

We claim:

1. A foil electret, comprising an electrically-charged dielectric foil having a charged surface, a fluid medium of high dielectric strength permanently in intimate contact with said charged surface, and means for maintaining said fluid medium in intimate contact with said charged surface comprising a further member which is imperious to said fluid medium and which sealed in fluid tight relationship to said foil along a continuous line which surrounds said charged surface.

2. An electret according to claim 1, wherein the fluid medium of high dielectric strength is a rarefied gas selected from the group consisting of carbon tetrachloride, sulphur hexafluoride and freon.

3. An electret according to claim 1, wherein the fluid medium of high dielectric strength is a rarefied gas.

4. An electret according to claim 1, wherein the fluid medium of high dielectric strength is a cryogenic liquid.

5. An electret according to claim 1, wherein said further member comprises a second dielectric foil sealed to the first foil, each dielectric foil being between 5 and 100 microns thick and each being made of a substance of high dielectric strength, adapted to preserve electric charges stored therein.

6. An electret according to claim 5, wherein the first dielectric foil is charged on both surfaces, both of which are permanently kept in intimate contact with a fluid medium of high dielectric strength enclosed between the aforementioned foil and another dielectric foil sealed to the first.

7. An electret according to claim 5, wherein the dielectric foils sealed to one another are circularly welded along the periphery of the charged surface which is to be stored.

8. An electret according to claim 1, wherein the dielectric foil is made of polypropylene.

* * * * *